United States Patent

[11] 3,619,659

[72] Inventors Bernard H. Meyer
Scottsdale, Ariz.;
Robert R. Greenwood, North Syracuse, N.Y.

[21] Appl. No. 881,562

[22] Filed Dec. 2, 1969

[45] Patented Nov. 9, 1971

[73] Assignee Honeywell Information Systems Inc.

[54] INTEGRATOR AMPLIFIER CIRCUIT WITH VOLTAGE REGULATION AND TEMPERATURE COMPENSATION

4 Claims, 4 Drawing Figs.

[52] U.S. Cl. .......... 307/263, 235/183, 307/297, 307/310, 328/127, 307/229

[51] Int. Cl. .......... H03k 5/12

[50] Field of Search .......... 307/263, 297, 310; 328/127; 235/183; 307/310; 330/23, 143

[56] References Cited

UNITED STATES PATENTS

| | | | |
|---|---|---|---|
| 3,440,448 | 4/1969 | Dudley .......... | 328/127 |
| 3,444,394 | 5/1969 | Coluson .......... | 307/263 |
| 3,529,180 | 9/1970 | Micheli .......... | 328/127 |

*Primary Examiner*—Donald D. Forrer
*Assistant Examiner*—David M. Carter
*Attorneys*—Edward W. Hughes and Fred Jacob

ABSTRACT: An integrator amplifier circuit for producing signal pulses of a trapezoidal shape having leading and trailing edges with constant rise and fall slopes during variations in operating potentials supplied to the circuit and equal rise and fall slopes during ambient temperature variations. The circuit is suitable for fabrication by integrated circuit technology and for use in a bipolar transmitter which derives bipolar signals from monopolar signals. Controlled input current flow from a switched voltage regulator and a component configuration designed to balance ambient temperature effects provide for constant and equal rise and fall times, respectively.

INVENTOR.
BERNHARD H. MEYER
ROBERT R. GREENWOOD

INTEGRATOR AMPLIFIER CIRCUIT WITH VOLTAGE REGULATION AND TEMPERATURE COMPENSATION

BACKGROUND OF THE INVENTION

The present invention relates to integrator circuits for deriving pulses and generally to data transmission circuits suitable for fabrication in integrated circuit form and suitable for use in a bipolar transmitter circuit.

The use of pulses and successions of pulses for high-speed data processing systems operating in a communications network environment wherein the presence or absence of a pulse is indicative in coded form of the modulation of a particular wave, and in data processor applications wherein the pulses are representative of specific bits of information, requires that these pulses have reliable characteristics. These reliable characteristics include rise and decay or fall times that are short in relation to the pulse width, an amplitude that is constant, and leading and trailing portions having constant and equal rise and fall slopes. The pulses are commonly received from logic circuits in the data processing system in the form of monopolar signals and converted to bipolar signals by a bipolar transmitter or communication interface circuit for applying to data transmission sets termed "modems" or "data sets" for transmission over transmission lines in a communications network.

During transmission and reception, pulses which initially have the characteristics suggested above are often distorted to such a degree that they cannot be used to perform the desired operations. There are many factors which cumulatively act to produce distorted pulses, one of the most disturbing of these being noise. Since square wave pulses transmitted along a transmission line have high-frequency components which frequently couple into adjacent transmission lines to induce noise, pulses with controlled rise and fall slopes are provided to reduce the high-frequency components. Factors effecting the rise and fall time such as variations in operating voltages or potentials applied to circuits deriving the pulses and ambient temperature fluctuation effects on circuit components, therefore, also contribute to distortion of the pulses and noise.

With increased data processing and data transmission speeds it is also becoming increasingly important to accurately control the signal response with regard to obtaining pulses for transmission having leading and trailing edges with equal rise and fall delay times and constant rise and fall slopes when the signals change polarity. Equal delay times and constant slopes are necessary to prevent the producing of erroneous or distorted information signal pulses and more particularly with regard to maintaining proper timing and synchronization of circuits connected to receive the information pulses. The requirement of equal and well defined delay times is, therefore, a desirable feature of integrator and bipolar transmitter circuits in that higher data transmission rates or speeds are thereby permitted.

Batch fabrication techniques such as monolithic integrated circuit processes find particular application in the production of circuits for use in data processing systems operating in a communications network environment wherein a large redundancy of communication circuits are required. Therefore, in the data processing and communications industries the batch fabrication of large numbers of active circuit devices of microminiature dimensions along with interconnections into a single monolithic semiconductor wafer or chip as an integrated circuit to form operative circuit arrangements is desirable.

It is, therefore, desirable further to extend the advantages of increased performance and reliability and reduced size, weight, power consumption, and unit cost obtained with monolithic integrated circuits by incorporating the circuitry for performing the integration and bipolar transmitter functions within a single chip of semiconductor material. However, existing communication interface circuits as fabricated using discrete components are relatively complicated and require additional active and passive components such as a plurality of capacitors and resistors with large resistance values as well as the simultaneous use of NPN and PNP-type transistors in order to improve the performance characteristics of the circuit. This is difficult within the state of the art of today's integrated circuit technology which most commonly provides only transistors of a single conductivity type within a single integrated circuit and avoids the provision of capacitors and resistors with large resistance values.

In one form of prior art integrator amplifier, a plurality of rise and fall time control means, each comprising a capacitor, may be collectively or individually connected in parallel across an amplifier transistor to provide for integration of input signal currents to establish a desired rise and fall slope or ramp of the leading and trailing edges of an output signal pulse. Signal currents are developed across impedance means in current paths specifically designed to operate with predetermined potentials supplied from suitable voltage sources. During the time in which the circuit is operated, the current paths for charging and discharging the capacitor may provide unequal charging and discharging currents due to changes in the potentials resulting in varying rise and fall slopes. Temperature effects on the impedance means and transistors further result in unequal rise and fall slopes. Similarly, in prior art bipolar transmitters the same results are encountered.

Thus, the prior art integrator amplifier and bipolar transmitter circuits have the disadvantage of requiring discrete component fabrication resulting in increased size, greater power consumption, weight and unit cost, and also the disadvantage of providing output signal pulses, having varying and unequal rise and fall slopes.

Accordingly, for high-speed data communications and present day integrated circuit data processing equipment it is desirable that the communication circuits be suitable for fabrication by integrated circuit techniques and that the rise and fall slopes of output signal pulses be accurately controlled to provide accurate timing of circuits connected to receive the derived or transmitted pulses at high speeds.

SUMMARY OF THE INVENTION

In accordance with the invention claimed an integrator amplifier circuit is provided which is suitable for integrated circuit fabrication and controls rise and fall time of output signals in the event of potential source variations and temperature changes. This is accomplished in the illustrative embodiment of the present invention by utilizing a current path switching means, a voltage regulation means, a plurality of impedance means, components with similar temperature coefficients, and an integrating amplifier transistor with an integrating capacitor connection means.

The impedance means, transistor, and a capacitor connected to the connection means are interconnected to form an integrator. During a succession of integration operations, the switching and regulation means respond to input signals of a predetermined threshold level to apply a constant reference potential to a first impedance means when the threshold is exceeded. The first impedance means is connected to respond to the absence and presence of the reference potential to function as a control current path which is switched into and out of the integrator to establish equal current flow across the capacitor and a second impedance means during capacitor charging and discharging. This provides output pulses having equal rise and fall slopes. The regulation means supplies a constant reference potential despite variations in operating potentials from unregulated potential sources for maintaining the rise and fall delay times and slopes constant. Thus, the illustrated embodiment may operate for variable operating potentials within a predetermined range of operating limits or levels and still maintain the provision of output signals having equal rise and fall delay times and constant slopes. The regulation means, transistor base to emitter junctions, and impedance means have similar temperature coefficients to balance ambient temperature effects thereby providing equal rise and fall slopes during ambient temperature changes.

Now, in accordance with the present invention, an integrator amplifier circuit suitable for use in a bipolar transmitter circuit is provided which is exceptionally well-suited for fabrication by monolithic integrated circuit technology in that it utilizes only semiconductor devices and resistors, has high speed, and good noise immunity. The circuit configuration also provides required equivalents of discrete component circuits by simultaneous use of NPN and PNP transistors and without the use of a plurality of capacitors and resistors having large resistance values. Improved response and reliability over discrete component integrator amplifiers and bipolar transmitters is thereby provided.

It is, therefore, an object of this invention to provide an integrator amplifier suitable for fabrication by integrated circuit techniques.

It is another object of this invention to provide an integrator amplifier circuit having improved control of the rise and fall slopes and rise and fall delay times of an output signal during variations in operating potentials applied to the circuit and ambient temperature changes.

It is still another object of this invention to provide an improved integrator amplifier for use in a bipolar transmitter circuit.

Further objects and advantages of the present invention will become apparent to those skilled in the art as the description thereof proceeds.

BRIEF DESCRIPTION OF THE DRAWINGS

The present invention may be more readily described by reference to the accompanying drawings in which.

DETAILED DESCRIPTION OF OPERATION

Figure 1:
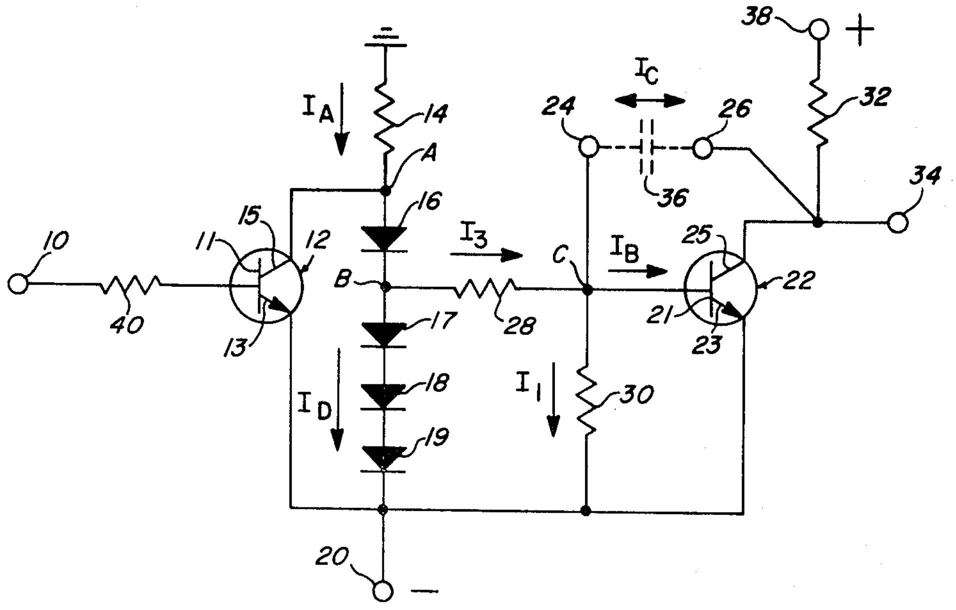
FIG. 1 is a schematic diagram of an integrator amplifier circuit constructed in accordance with the present invention.

Referring to FIG. 1, there is depicted an integrator amplifier circuit suitable for fabrication by integrated circuit fabrication techniques comprising an input terminal 10 to which input signals are applied, a current path switching means having a switching transistor 12, a voltage regulating means in the form of resistor 14 and diodes 16–19, impedance means or resistors 28 and 30, an amplifier transistor 22, integrating capacitor connection means or terminals 24 and 26, a constant current source or impedance means 32, and an output terminal 34.

Transistors 12 and 22 are well-known NPN-type transistors. In NPN-type transistors the base-collector or base-emitter junction is forward-biased with a voltage potential applied to the N-type semiconductor material is more negative than a voltage applied to the adjoining P-type semiconductor material. Similarly, a junction is reverse-biased when a negative voltage is applied to the P-type semiconductor material and a positive voltage is applied to the adjoining N-type semiconductor material. The transistor operates in a conductive condition when the base-emitter junction is forward-biased and the base-collector junction is reverse-biased. If both the base-emitter junction and the base-collector junction are reverse-biased the transistor is nonconductive.

Figure 2:
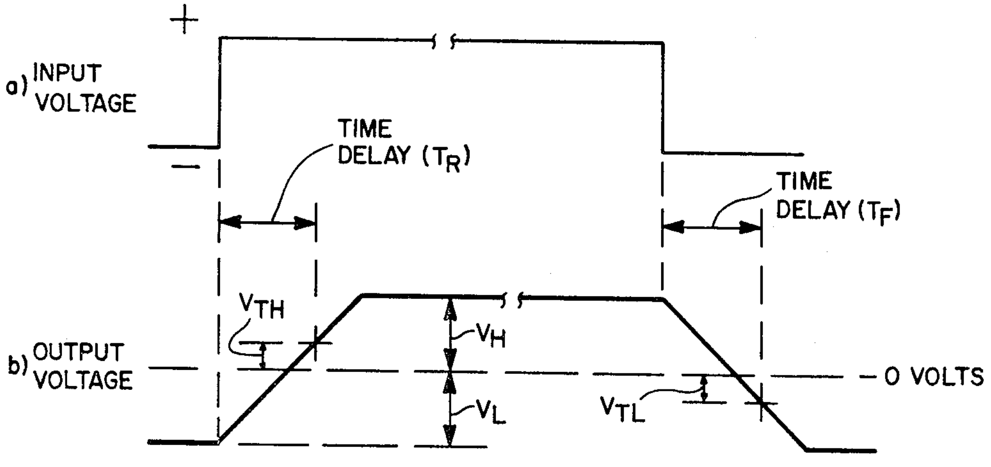
FIGS. 2*a* and 2*b* are waveform diagrams illustrating the conditions of the inputs and outputs of the integrator amplifier of FIG. 1, respectively, during provision of an output signal in response to an input signal.

The operation of the integrator amplifier will now be described with reference to FIG. 1. If we assume that a suitable operating potential of approximately −10 volts is present on an emitter 13 of transistor 12, an input signal voltage which is rising to a more positive value during a signal transition (as illustrated in FIG. 2*a*) applied to signal input terminal 10 causes a base 11 to become more positive than emitter 13. In a typical integrated transistor there is a voltage drop of approximately 0.75 volt between base 11 and emitter 13 to render transistor 12 conductive. Accordingly, when the base 11 becomes −9.25 volts due to an input signal of a predetermined level, transistor 12 becomes conductive. In a typical integrated transistor in a fully conductive or saturated state there is a voltage drop of approximately 0.3 volt across the emitter to collector junctions, therefore, the potential of a switch signal at a collector 15 of transistor 12 and at a junction point A of a switched voltage regulator becomes approximately −9.7 volts.

The switched voltage regulator formed by resistor 14 and series connected diodes 16–19 connected between terminal 20 and a ground potential responds to the switch signal at point A to provide a regulated signal or reference potential at a junction point B. With a −9.25 volts signal at point A, all of the series diodes 16–19 become nonconductive and if current was flowing through a first impedance means or resistor 28 toward a base 21 of transistor 22, it will be switched off or stop flowing. If we assume that, before the input signal transition, transistor 22 was in a conductive state, the potential at base 21 will be approximately −9.25 volts. Transistor 22, resistor 28, and an external capacitor 36 connected across terminals 24 and 26 provide an integrator which may be by way of example, a well-known Miller Integrator, for operation in the manner described in *Principles of Transistor Circuits*, Edited by R. F. Shea, John Wiley and Sons, Inc., New York, Seventh Printing, Dec. 1957, pp. 414–419.

With the current flowing through resistor 28 switched off, the capacitor 36 will charge and a voltage potential at a collector 25 output terminal 34 will rise at a constant rate or slope with respect to time as established by the capacitance and resistance values of capacitor 36 and and a second impedance means or resistor 30. At the beginning of a rising voltage slop as illustrated in FIG. 2*b* , the voltage at collector 25 will be at its most negative voltage. A positive potential source which may, by way of example, provide a potential of +10 volts is connected at a terminal 38. A current flowing from the potential source, into collector 25 is held relatively constant by a constant current source, to be described hereinafter, or by a resistor 32. Current flowing into the base 21 of transistor 22 and identified as $I_B$ in FIG. 1 is of a significantly lower magnitude than other currents to be described hereinafter. This is due to transistor 22 providing large current amplification and, therefore, an insignificant current magnitude compared to the magnitude of currents identified as $I_1$, $I_3$, and $I_C$ is required to provide a large output current. Considering $I_B$ to be insignificant during the charging of capacitor 36, a capacitor current $I_C$ flowing through or into the capacitor will be equal to $I_1$ flowing through resistor 30 since this is the only path for current flow available due to a current path switching effect at point B. In this manner resistor 28 operates as a control current path which is switched out of the integrator.

During the time that the voltage is rising in accordance with the rise slope shown in FIG. 2*b*, transistor 22 is conductive to maintain its emitter to base voltage substantially constant 0.75 volt. This same voltage appears across resistor 30, therefore, since the resistor value is substantially constant, $I_1$ is held substantially constant at a value equal to a 0.75 volt divided by the resistance of resistor 30 during charging of the capacitor. Therefore, the capacitor charges at a constant rate and the resulting rise slope of the output voltage at terminal 34 is constant. The slope of the output voltage is defined by the resistance value of resistor 30, the capacitance value of capacitor 36, and and the emitter to base voltage of transistor 22, all of which are independent of the potentials from the sources of operating potential over a predetermined range of potential levels which may be, by way of example, for variations of ±3 volts for the operating potentials supplied by either source.

At the time the output voltage attains a potential designated as $V_H$, FIG. 2*b*, representing a maximum positive potential determined by the source of positive operating potential, the capacitor will be charged to $V_H$. With capacitor 36 charged to $V_H$, the current through the capacitor must cease to flow, which means that the current $I_1$ must decrease to 0. The potential at base 21 of transistor 22 is, consequently, reduced to render transistor 22 nonconductive.

An input signal voltage which is falling to a more negative value during a signal transition, as illustrated in FIG. 2a, applied to signal input terminal 10 causes base 11 of transistor 12 to become more negative than or approach the same voltage as emitter 13. Accordingly, when base 11 becomes more negative than −9.25 volts, transistor 12 becomes nonconductive. With no current flowing across the collector to emitter junctions of transistor 12, the switched regulator or series combination of resistor 14 and diodes 16–19 have a voltage which is, by way of example, 10 volts applied across the combination with a polarity such as to forward-bias or render the diodes conductive. In a typical integrated diode there is a voltage drop of approximately 0.75 volt across each diode in a conductive state. Since there is a voltage drop of 0.75 volt across each of diodes 17–19, there will be a regulated signal having a potential of −7.75 volts at junction point B. This produces a current shown as $I_3$ which is switched into resistor 28, and divides between current $I_C$ *through capacitor* 36, $I_B$ into base 21 and $I_1$ through resistor 30. The voltage at the collector 25 of transistor 22 begins to drop at a constant rate at a desired fall slope, as determined by the resistance values of resistors 28 and 30 and the capacitance value of capacitor 36.

At the beginning of the fall slope illustrated in FIG. 2b, the voltage at collector 25, FIG. 1, is at its most positive potential or voltage. As previously described with reference to the rise slope, the value of current $I_B$ is insignificant and may be neglected. With transistor 22 in a conductive state, the voltage across resistor 30 is 0.75 volt, and that across resistor 28 is approximately 1.5 volts or the difference between −7.75 volts at junction point B and −9.15 volts at junction point C. By selecting resistors 28 and 30 as having the same resistance value, a current $I_3$ will be equal to two times $I_1$. This provides for $I_C$ to be equal to $I_1$, which also has the same value as current $I_1$ for the rise slope. Capacitor 36 will, therefore, charge in an opposite direction and at the same rate as previously described for the rise slope. The slope of the falling voltage transition as illustrated in FIG. 2b will depend on the resistance values of resistances 28 and 30, the capacitance value of the capacitor 36, and the emitter to base voltage of transistor 22 which are independent of the operating potentials supplied from the sources connected at terminals 20 and 38, FIG. 1. The fall slope will similarly, as described for the rise slope, be constant for operating potential variations of approximately ±3 volts.

The approximate voltage regulation capability of diodes 17–19 may be calculated according to the following formulas derived in accordance with the well-known Kirchoff's law:

$$I_A = \frac{-\text{(source potential)} - 4\ \text{(diode voltage drops)}}{\text{resistance of resistor 14}}$$

$$I_A = I_D + I_3$$

$$I_3 = \frac{\text{3 diode voltage drops} - \text{1 base to emitter voltage drop}}{\text{resistance of resistor 28}}$$

$$= \frac{\text{2.25 volts} - \text{.75 volt}}{\text{resistor 28}}$$

$$= \frac{\text{1.5 volts}}{\text{resistor 28}}$$

Therefore, $$I_A = I_D + I_3$$

$$\frac{-\text{(source potential)} - 4(.75)\ \text{volts}}{\text{resistor 14}} = I_D + 1.5\ \text{volts}$$

$$= I_D + \frac{\text{1.5 volts}}{\text{resistor 28}}$$

When $I_D$ approaches zero, $$-\text{(source potential)} = \frac{\text{resistor 14}}{\text{resistor 28}}(1.5) + 3$$

If resistor 14 has a resistance value of twice the resistance value of resistor 28 the source potential may be calculated to be −6 volts.

Accordingly, voltage regulation is provided until the current through diodes 17–19 becomes zero, which will be when the source potential is −6 volts. Thus, voltage regulation for a variation of +4 volts is provided. It can be similarly shown that a voltage variation of an approximate like amount for each operating potential may be encountered without significantly effecting the rise and fall slopes.

As illustrated in FIG. 2b, a rise delay time and a fall delay time identified as $T_R$ and $T_F$, are equal for the case where the slopes of the rise and fall voltage waveform are equal, a high and low level voltage identified as $V_H$ and $V_L$ are equal and a high and low level threshold voltage identified as $V_{TH}$ and $V_{TL}$ are equal. Equal slopes are obtained as previously described, and $V_H$ and $V_L$ will be equal if the sources of positive and negative operating potentials supply potentials having equal magnitudes. The threshold voltages $V_{TH}$ and $V_{TL}$ are defined by the requirements of a circuit that is utilizing the output signals. It is a normal operating requirement that circuits such as, for example, bipolar transmitters be designed to operate with utilization circuits having the $V_{TH}$ substantially equal to $V_{TL}$. Thus, all of the conditions for equal delay times $T_R$ and $T_F$ may be provided for the integrator amplifier circuit illustrated.

The integrator amplifier circuit components may be selected to have similar temperature coefficients to balance ambient temperature effects thereby further providing for equal rise and fall slopes during temperature changes. In the case of integrated circuit fabrication techniques two variables with respect to temperature changes that effect the rise and fall slopes are the resistance values and base to emitter or diode forward voltage drops. With very close thermal coupling on a semiconductor die or chip substrate area, the forward voltages across diodes 17–19 and across the emitter to base junctions of transistor 22 vary equally with temperature to balance the temperature effects. The resistance values of resistors 28 and 30 also vary so as to maintain a constant ratio of resistor values. Accordingly, the magnitudes of $I_C$ current flow for the rise and fall slopes are maintained substantially equal. Temperature effects may be similarly balanced in discrete component circuits by proper selection of components with similar temperature coefficients.

Figure 3:
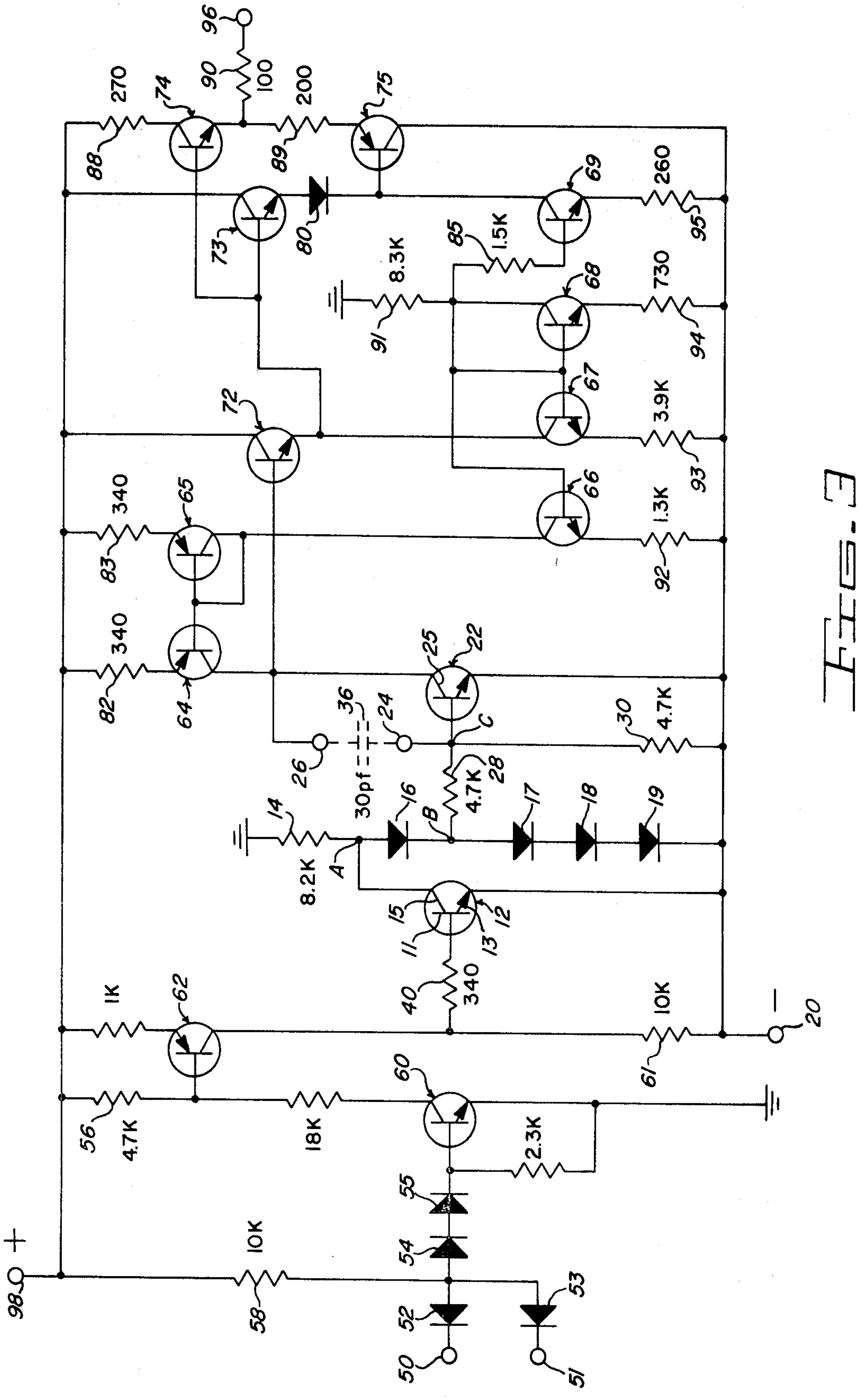
FIG. 3 is a schematic diagram of a bipolar transmitter circuit in which the integrated amplifier circuit constructed in accordance with the present invention may be used.

The integrator amplifier circuit previously described is suitable for use in a bipolar transmitter which may be, by way of example, the bipolar transmitter illustrated in FIG. 3. Typical component values in ohms for resistors and in pico-farads for an external capacitor are shown in FIG. 3 for an integrator amplifier constructed in accordance with the instant invention and incorporated into a bipolar transmitter circuit. The amplifier and transmitter are suitable for fabrication by integrated circuit technology to provide output signals with constant slope for potential source variations within a predetermined range of variations in operating potentials and equal slopes when temperature changes are encountered within a predetermined range determined by selected component temperature coefficients.

The bipolar transmitter illustrated in FIG. 3 is comprised of an input stage having a well-known diode-transistor logic type of input formed by input terminals 50 and 51, diodes 52–55, resistor 58, and transistor 60; a level changing transistor 62; an integrator amplifier circuit as previously described; a current source and sink stage comprising transistors 64–69, and resistors, 82, 83, 85, and 91–95; and an output stage comprising transistors 72–75, resistors 88–90, diode 80 and an output terminal 96.

Transistors 62, 64, 65, and 75 are PNP-type type transistors which may be, by way of example, integrated lateral PNP transistors constricted as described in H. C. Lin et al., "Lateral Complementary Transistor Structure for Simultaneous Fabrication of Functional Blocks," *Proceedings of IEEE*, Vol. 52, Dec. 1964 (pp. 1491–1495).

Operation of the overall bipolar transmitter will now be described with reference to FIG. 3. If we assume that a suitable potential of +3 volts is normally applied to a terminal 51 and that an input signal having suitable alternating voltage levels or potentials of like polarity which may be, by way of example, +3 volts and +0.2 volt, respectively, is applied to an input terminal 50, transistor 60 will have its base to emitter junction alternately forward-biased and reverse-biased, respectively.

When the input signal voltage rises to a voltage more positive than approximately +1.4 volts, diodes 52 and 53 become nonconducting and diodes 54 and 55 conduct current, some of which enters the base of transistors 60. The current flow results in a positive potential at the base of transistor 62 which is less positive than its potential at the emitter electrode. Transistor 62 is thereby rendered conductive to provide a positive potential at the base of transistor 12 which functions as a switch in the manner previously described. The integrator amplifier responds to the switch to provide an integrated signal having a rise slope and positive potential, as illustrated in FIG. 2*b*, at the base of transistor 72 of the output stage. The base and emitter of transistor 72 are also connected to a current source and sink, respectively, which provide constant currents in a manner to be described hereinafter.

Transistors 72–74 of the output stage function as well-known emitter-followers such that output signal at terminal 96 follows the rise slope and potential of the signal at the base of transistor 72 and has a $V_H$ determined by a suitable positive potential which may be, by way of example, +10 volts applied from a source at terminal 98. Transistor 73 is also rendered conductive to provide a positive potential on its emitter to forward-bias diode 80 thereby providing a positive potential at a base of transistor 75 rendering transistor 75 nonconductive.

In a similar manner, when the input signal voltage at terminal 50 falls to a voltage more negative than approximately +1.4 volts, diode 52 becomes conductive and the voltage applied to the series combination of diodes 54 and 55 and the emitter to base junction of transistor 60 is not sufficient to render transistor 60 conductive.

With transistor 60 nonconductive, there is no current across the collector to emitter path through transistor 60 and, therefore, no voltage across resistor 56. Thus, the potential at the base of transistor 62 becomes more positive than its emitter voltage or of the same value as its emitter voltage to render transistor 62 nonconductive thereby providing a negative potential through resistors 61 and 40 to the base of switching transistor 12. Switch transistor 12 then functions in the manner previously described for the integrator amplifier to provide an integrated signal having a fall slope and negative potential as illustrated in FIG. 2*b* at the base of transistor 72 of the output stage.

The emitter-followers proved by transistors 72 and 73 function to provide a potential at the emitter of transistor 73 which reverse-biases diode 80 to permit a negative potential to be applied at the base of transistor 75 from a collector of transistor 69 which functions as a current sink in a manner to be described hereinafter. Transistor 75 is thereby rendered conductive to provide an output signal at terminal 96 which follows the fall slope and potential of the signal at the base of transistor 72. The output signal also has a $V_L$ determined by a suitable negative potential which may be, by way of example, −10 volts applied from a source to a terminal 20.

Provision of the current source and sinks will now be described with reference to FIG. 3. Transistor 64 is referred to as a constant current source because current flows in a direction out of its collector and transistors 67 and 69 are referred to as current sinks because current flows in a direction into their respective collectors. The currents are referred to as being constant because the current values do not change significantly as the signal currents and voltages change within the transmitter circuit. The configuration illustrated is commonly employed in integrated circuits to establish constant current sources and sinks.

A suitable potential is established at the collector and base of transistor 68 by proper choice of the resistance values of resistors 91 and 94. Proper selection of resistance values for resistors 92, 93, and 95 provides for establishing collector currents of transistors 66, 67, and 69. These currents do not vary significantly as the collector potentials are varied in response to an input signal due to transistor characteristics selected to provide a desired current flow. The collectors of transistors 66, 67, and 69 are, therefore, essentially constant current sinks. The collector current of transistor 66 is the sum of the collector current of transistor 65 plus the base currents of transistors 64 and 65. Since resistors 82 and 83 have equal resistance values and transistor 64 is identical to transistor 65, the collector current of these transistors will be substantially equal. The collector current of transistor 64 is essentially independent of its collector voltage; therefore, by choosing the resistance value of resistor 92, a desired value of constant current from source 64 is provided.

The output stage transistors 74 and 75 are connected in a well-known complementary symmetry configuration. Since these two transistors receive signals from transistors operating in well-known common-collector or emitter-follower configurations, an output voltage that is a replica of an input voltage is attained. Diode 80 provides an offset voltage that biases transistors 74 and 75 to reduce distortion of the output signals during the rise and fall slopes. By choosing proper combinations of resistors 82, 83, 85, 94, and 95, $V_H$ and $V_L$ may be adjusted to be equal. Resistors 88–90 provide for limiting the output current and circuit power dissipation in cases of accidental connection of the output terminal to an undesirable terminal or potential.

The circuit configuration as illustrated in FIG. 1 for an integrator amplifier suitable for fabrication in integrated circuit form has provided for the elimination of internally connected capacitors since they are difficult to fabricate by integrated circuit techniques while still retaining the essential features of integration to provide output signals having equal rise and fall slopes.

From the foregoing description it is seen that an improvement in the degree of providing equal rise and fall slopes and delay times during operating potential and temperature changes is provided as well as batch fabrication of circuits of this type using integrated circuit techniques. In particular, the improved integrator amplifier and bipolar transmitter of this invention lends itself to the incorporation into integrated devices.

Although the invention has been disclosed specifically in terms of a particular polarity orientation, it will be understood that similar integrator and bipolar transmitter functions may be accomplished by using these same circuit configurations while reversing polarities through the circuit including changing transistors to an opposite type of transistor such as PNP-types to NPN-types and NPN-types to PNP-types.

Thus, in accordance with the invention claimed, a new and improved integrator amplifier and bipolar transmitter suitable for fabrication by integrated circuit techniques is provided in which more constant rise and fall time of the output signal when operating potentials vary is provided from that obtained by use of the prior art. Accordingly, the advantages of size, power consumption, lower cost, as well as improved performance are obtained.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are, therefore, intended to cover and embrace any such modifications, within the limits only of the true spirit and scope of the invention.

1. An integrator circuit comprising: first and second transistors each having a base, a collector and an emitter;

first, second and third reference potentials, said emitters of said first and said second transistors being connected to said first reference potential;

first, second, third and fourth resistors, said first resistor being connected between said second potential and said collector of said first transistor;

first and second diode means, said first diode means being connected between said collector of said first transistor and a junction point, said second diode means being connected between said emitter of said first transistor and said junction point, said second resistor being connected between said base of said second transistor and said junction point, said third resistor being connected between said base of second transistor and said first potential;

a signal input terminal, said input terminal transistor coupled to said base of said first transistor, said fourth resistor being connected between said collector of said second transistor and said third potential;

a capacitor, said capacitor being connected between said base of said second transistor and said collector of said second transistor; and a signal output terminal, said output terminal being connected to said collector of said second transistor.

2. An integrator circuit as defined in claim 1 wherein said first and said second diode means and said second transistor have similar temperature coefficients, and said first and said second resistors have similar temperature coefficients whereby ambient temperature changes result in balanced temperature effects to maintain equal rise and fall slopes in a signal at said output terminal when said temperature changes occur.

3. An integrator circuit comprising: first and second transistors each having a base, collector and an emitter;

first and second reference potentials, said emitters of said first and said second transistors being connected to said first potential;

first, second and third resistors, said first resistor being connected between second potential and said collector of said first transistor;

first and second diode means, said first diode means being connected between said collector of said first transistor and a junction point, said second diode means connected between said emitter of said first transistor and said junction point, said second resistor being connected between said base of said second transistor and said junction point;

a signal input terminal, said input terminal being coupled to said base of said first transistor, said third resistor being connected between said base of said second transistor and said emitter of second transistor;

a capacitor, said capacitor being connected between said base of said second transistor and said collector of said second transistor;

a current source, said source being connected to said collector of said second transistor; and a signal output terminal, said output terminal being connected to said collector of said second transistor.

4. An integrator circuit as defined in claim 3 including:

a sink, said sink being connected to said collector of said second transistor.

UNITED STATES PATENT OFFICE

CERTIFICATE OF CORRECTION

Patent No. 3,619,659 Dated November 9, 1971

Inventor(s) Bernhard H. Meyer, et. al.

It is certified that error appears in the above-identified patent and that said Letters Patent are hereby corrected as shown below:

On the cover sheet [54] "4 Claims, 4 Drawing Figs." should read -- 4 Claims, 3 Drawing Figs. -- .

Signed and sealed this 12th day of December 1972.

(SEAL)
Attest:

EDWARD M.FLETCHER,JR.
Attesting Officer

ROBERT GOTTSCHALK
Commissioner of Patents